US009476635B2

(12) United States Patent
Nelson

(10) Patent No.: US 9,476,635 B2
(45) Date of Patent: Oct. 25, 2016

(54) RADIO FREQUENCY IDENTIFICATION HEAT FLUX MEASUREMENT SYSTEMS FOR REFRIGERATOR VACUUM INSULATION PANELS

(71) Applicant: General Electric Company, Schenectady, NY (US)

(72) Inventor: Roger Shawn Nelson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 210 days.

(21) Appl. No.: 14/314,472

(22) Filed: Jun. 25, 2014

(65) Prior Publication Data

US 2015/0377544 A1    Dec. 31, 2015

(51) Int. Cl.
*F25D 23/06* (2006.01)
*F25D 23/00* (2006.01)
*G01K 11/26* (2006.01)
(Continued)

(52) U.S. Cl.
CPC ............ *F25D 23/065* (2013.01); *F25D 23/00* (2013.01); *F25D 29/005* (2013.01); *G01K 1/024* (2013.01); *G01K 1/026* (2013.01); *G01K 11/26* (2013.01); *F25D 2201/14* (2013.01); *F25D 2700/12* (2013.01); *G01K 2207/00* (2013.01); *G06K 19/0717* (2013.01)

(58) Field of Classification Search
CPC .............. G06K 7/10366; G06K 19/0717; G01K 1/028; G01K 2207/00; F25D 23/065
USPC ............................ 340/10, 12.51, 13.26, 585
See application file for complete search history.

(56) References Cited

U.S. PATENT DOCUMENTS 7,472,555 B2    1/2009  Kirby et al.
2005/0248249 A1*  11/2005  Kirby ................... F25D 23/062
312/401
(Continued)

FOREIGN PATENT DOCUMENTS

JP     2012180904    9/2012

OTHER PUBLICATIONS

"Innovative Wireless Sensing™." www.phaseIVengineering.com. Phase IV Engineering, Inc. Web. May 7, 2014.
(Continued)

*Primary Examiner* — Thomas Alunkal
(74) *Attorney, Agent, or Firm* — Dority & Manning, P.A.

(57) ABSTRACT

Radio frequency identification heat flux measurement systems for refrigerator vacuum insulation panels and methods of operation thereof are provided. One example refrigerator includes a plurality of vacuum insulation panels respectively positioned within a plurality of walls of the refrigerator. The plurality of walls of the refrigerator define an interior refrigerated space. Each of the plurality of vacuum insulation panels includes a conductive barrier layer forming a jacket around such vacuum insulation panel. The refrigerator includes a plurality of radio frequency identification (RFID) temperature sensors respectively positioned adjacent to the plurality of vacuum insulation panels. The refrigerator includes an RFID receiver. Each of the plurality of RFID temperature sensors transmits information concerning a local temperature to the RFID receiver. Each of the plurality of RFID temperature sensors utilizes the conductive barrier layer of its adjacent vacuum insulation panel as an antenna during the transmission of the information.

15 Claims, 5 Drawing Sheets

(51) Int. Cl.
*G01K 1/02* (2006.01)
*F25D 29/00* (2006.01)
*G06K 19/07* (2006.01)

(56) References Cited

U.S. PATENT DOCUMENTS

| | | | | |
|---|---|---|---|---|
| 2008/0178621 | A1* | 7/2008 | Kang | F25B 5/04 |
| | | | | 62/179 |
| 2008/0272131 | A1* | 11/2008 | Roberts | G01K 1/14 |
| | | | | 220/592.25 |
| 2009/0031659 | A1* | 2/2009 | Kalfon | E04B 1/803 |
| | | | | 52/404.1 |
| 2009/0095818 | A1* | 4/2009 | Smith | G06K 19/07749 |
| | | | | 235/492 |
| 2012/0144847 | A1* | 6/2012 | Lee | F25D 27/005 |
| | | | | 62/56 |
| 2012/0278228 | A1* | 11/2012 | Rubinstein | G07G 1/009 |
| | | | | 705/39 |
| 2013/0201032 | A1* | 8/2013 | Hewitt | H04Q 9/00 |
| | | | | 340/870.02 |
| 2013/0221011 | A1* | 8/2013 | Yoon | B29C 53/06 |
| | | | | 220/592.1 |

OTHER PUBLICATIONS

"Innovative Wireless Sensing™ *Sens*TAG™ UHF RFID Passive Temperature Sensor Kit Product Description." www.phaseIVengineering.com. Phase IV Engineering, Inc. Web. May 7, 2014.

"Innovative Wireless Sensing™ Industrial Wireless Sensor Network (WSN)." www.phaseIVengineering.com. Phase IV Engineering, Inc. Web. May 7, 2014.

"Innovative Wireless Sensing™ *Micro*-T™ Miniature RFID Data Logger System." www.phaseIVengineering.com. Phase IV Engineering, Inc. Web. May 7, 2014.

"About Wireless RFID Sensors (Battery-Free)" www.phaseivengr.com\wireless-technologies. Phase IV Engineering, Inc. Web. May 7, 2014.

"RFID Temperature Sensors." www.phaseivengr.com. Phase IV Engineering, Inc. Web May 7, 2014.

"Temperature Sensor—Wireless Sensor Network WSN." www.phaseivengr.com. Phase IV Engineering, Inc. Web. May 7, 2014.

* cited by examiner

RADIO FREQUENCY IDENTIFICATION HEAT FLUX MEASUREMENT SYSTEMS FOR REFRIGERATOR VACUUM INSULATION PANELS

FIELD OF THE INVENTION

The present disclosure relates generally to vacuum insulation panels in a refrigerator. More particularly, the present disclosure relates to radio frequency identification heat flux measurement systems for testing and/or monitoring proper functioning of vacuum insulation panels installed within or intended for installation within a refrigerator.

BACKGROUND OF THE INVENTION

A vacuum insulated panel is a form of thermal insulation made up of a nearly gas-tight enclosure surrounding a rigid core, from which the air has been evacuated. Vacuum insulation panels have a number of different applications, including for use inside refrigerator cabinets.

In refrigerator applications, separate vacuum insulation panels can be utilized in combination with conventional foam or fiberglass insulation within the walls of the refrigerator. Such vacuum insulation panels are used to decrease the heat leakage into a refrigerator and therefore decrease the energy required to operate the refrigerator. As an example, the vacuum insulation panels can be attached to the metal refrigerator case prior to inserting insulating material.

If a vacuum insulation panel loses its vacuum seal or otherwise becomes ruptured or damaged, the insulative functionality of the panel will decrease substantially. Therefore, systems and methods for testing and monitoring proper functioning of vacuum insulation panels—both prior to installation and after installation—are desirable.

However, the challenges of validating proper functioning of vacuum insulation panels within a factory operation or within a post-manufacturing environment have limited the full utilization of vacuum insulation technology. For example, internal sensors within the vacuum panel and pre-installation testers have been previously desired to sort ruptured or improperly manufactured panels. However, these techniques are limited in their benefits for multiple reasons, including the feasibility of detecting failures due to temperature sensitivity or the difficulty of measuring assembled vacuum insulation panels after all factor processes have occurred.

As another example, thermal imaging cameras have been used which utilize the exothermic results produced from chemical insulation foam reactions to look for hot spots that would occur if the vacuum insulation panels failed. However, these are limited in reliability with alpha and beta error due to the time-dependent function of needing the ability to visually observe the panel at the proper moment in time.

Therefore, improved systems and methods for testing and/or monitoring proper functioning of vacuum insulation panels installed within or intended for installation within a refrigerator are desirable.

BRIEF DESCRIPTION OF THE INVENTION

Aspects and advantages of the invention will be set forth in part in the following description, or may be obvious from the description, or may be learned through practice of the invention.

One aspect of the present disclosure is directed to a refrigerator. The refrigerator includes a plurality of vacuum insulation panels respectively positioned within a plurality of walls of the refrigerator. The plurality of walls of the refrigerator define an interior refrigerated space. Each of the plurality of vacuum insulation panels includes a conductive barrier layer forming a jacket around such vacuum insulation panel. The refrigerator includes a plurality of radio frequency identification (RFID) temperature sensors respectively positioned adjacent to the plurality of vacuum insulation panels. The refrigerator includes an RFID receiver. Each of the plurality of RFID temperature sensors transmits information concerning a local temperature to the RFID receiver. Each of the plurality of RFID temperature sensors utilizes the conductive barrier layer of its adjacent vacuum insulation panel as an antenna during the transmission of the information.

Another aspect of the present disclosure is directed to a method for monitoring functionality of vacuum insulation panels installed within a refrigerator. The method includes transmitting, by a radio frequency identification (RFID) temperature sensor, data describing a local temperature at the RFID temperature sensor. The RFID temperature sensor is positioned adjacent to a vacuum insulation panel installed within a refrigerator. The RFID temperature sensor uses a conductive barrier layer of the vacuum insulation panel as an antenna to perform the transmitting. The method includes receiving, by an RFID receiver, the data describing the local temperature at the RFID temperature sensor and providing such information to a controller. The method includes determining, by the controller, a temperature difference between the local temperature at the RFID temperature sensor and a reference temperature. The method includes determining, by the controller, whether the vacuum insulation panel is properly functioning based at least in part on the temperature difference.

Another aspect of the present disclosure is directed to a method for testing functionality of vacuum insulation panels. The method includes transmitting, by a radio frequency identification (RFID) temperature sensor, data describing a local temperature at the RFID temperature sensor. The RFID temperature sensor is positioned adjacent to a first side of a vacuum insulation panel. A heat source is positioned adjacent to a second side of the vacuum insulation panel. The RFID temperature sensor uses a conductive barrier layer of the vacuum insulation panel as an antenna to perform the transmitting. The method includes receiving, by an RFID receiver, the data describing the local temperature at the RFID temperature sensor and providing such information to a processor. The method includes determining, by the processor, whether the vacuum insulation panel is properly functioning based at least in part on the data describing the local temperature at the RFID temperature sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
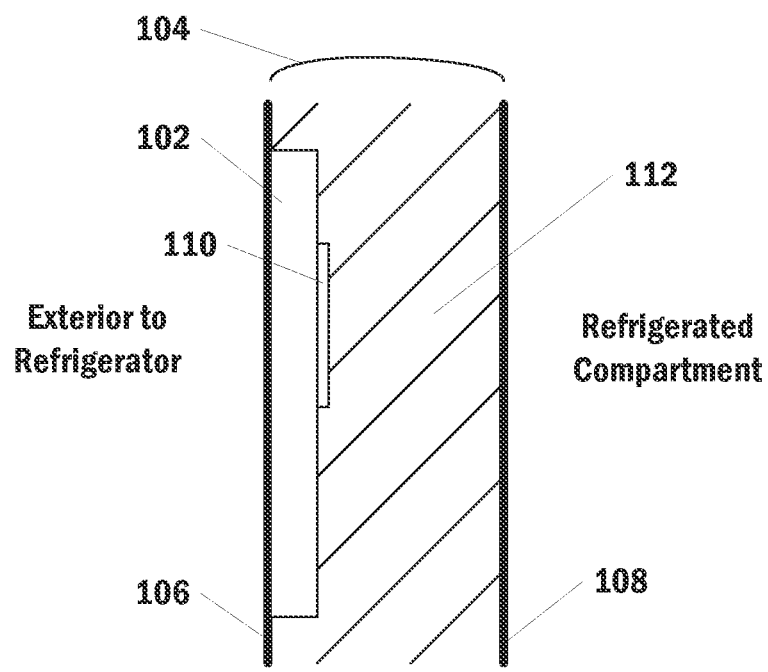
FIG. 1 depicts a first example sensor placement according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to radio frequency identification (RFID) based systems for testing and/or monitoring proper functioning of vacuum insulation panels installed within or intended for installation within a refrigerator. In particular, the RFID systems and associated methods of operation provide rapid and accurate testing or verification of proper functioning of the vacuum insulation panels.

More particularly, one or more UM temperature sensors can be respectively placed at various locations adjacent to one or more vacuum insulation panels. For example, each RFID temperature sensor can be positioned adjacent to an outer conductive barrier layer surface of a corresponding vacuum insulation panel. The sensor can be placed internal to the vacuum insulation panel or external to the vacuum insulation panel.

Each RFID temperature sensor can measure a local temperature and transmit such information to an RFID receiver. For example, each temperature sensor can include a thermistor and can measure the temperature by placing a current through or voltage across the thermistor.

Each RFID temperature sensor can be actively powered by a battery or other power source. Alternatively, each RFID temperature sensor can be passively powered by capturing external electrical impulse energy. For example, the externally gathered energy can accumulate or can be immediately utilized to energize the temperature measurement device and transmit the temperature information to the receiver. Use of passively powered RFID sensors can provide a reduced risk when the sensors are used in conjunction with an unstable or volatile foaming agent.

Each RFID temperature sensor can transmit temperature information to the RFID receiver periodically or can transmit such information upon the RFID sensor being queried or otherwise electronically requested to transmit the temperature measurement. The transmitted information can include an actual temperature reading or can be a sensor value that can be used to calculate or otherwise determine the local temperature at the sensor.

Furthermore, according to an aspect of the present disclosure, when each RFID temperature sensor transmits information, it can utilize a conductive barrier layer of the corresponding vacuum insulation panel as an antenna. In particular, each vacuum insulation panel can include a conductive barrier layer that forms a jacket around the panel. For example, the barrier layer can be a layer of aluminum, steel, or other metal.

The RFID sensor device can use such conductive barrier layer as a transmitter antenna. Use of the barrier layer as an antenna can improve transmission strength and reduce the cost of manufacturing the RFID sensors as additional antennas will not be needed.

The RFID reader can read or otherwise communicate with multiple RFID sensors simultaneously. Therefore, a single RFID reader can be easily deployed to monitor or test multiple vacuum insulation panels at a single time, thereby reducing cycle time for quality checks.

The RFID temperature sensors may be placed at various positions to assist in monitoring or testing the vacuum insulation panels. As an example, in some embodiments the RFID system can be used to test vacuum insulation panels prior to installation. For example, the panels may be placed on a heat source (e.g. a heated table). An RFID temperature sensor can be positioned on the opposite side of each vacuum insulation panel from the heat source. The temperature reading provided by each RFID temperature can be used to identify panels that are defective. For example, if an elevated temperature is detected at an RFID sensor, then the vacuum insulation panel is allowing heat transfer from the heat source and is therefore defective.

As another example, in some embodiments, the RFID system can be used to test vacuum insulation panels during installation. For example, the addition of insulation foam within a refrigerator wall can be a forceful event that can potentially cause loss of vacuum seal for a panel. In addition, many commonly used foams expand according to a reaction that provides exothermic results. Therefore, an RFID temperature sensor can be positioned on the opposite side of each vacuum insulation panel from the foam insulation. If an increase in temperature is detected when the foam is introduced, then the vacuum insulation panel is allowing heat transfer from the exothermic reaction and is therefore defective.

As yet another example, the RFID system can be used to monitor vacuum insulation panel integrity over the lifetime of a refrigerator in which such panels are installed. For example, in some embodiments, an RFID temperature sensor can be placed adjacent to an interior face of each vacuum insulation panel (e.g. on the refrigerated side of the vacuum insulation panel. A temperature difference between an internal refrigerated compartment and the local temperature at each RFID temperature sensor can be monitored. When the temperature difference for one of the RFID sensors exceeds a threshold value, then it can be assumed that the corresponding vacuum insulation panel has failed and is allowing exterior heat to transfer into the refrigerator.

As another example, in some embodiments, a pair of RFID temperature sensors can be respectively placed adjacent to the interior face and an exterior face of each vacuum insulation panel. A temperature difference between the local temperatures at each pair of RFID temperature sensors can be determined. When the temperature difference for a pair of RFID sensors drops below a threshold value, then it can be assumed that the corresponding vacuum insulation panel has failed and is allowing exterior heat to transfer into the refrigerator.

When it is determined that one or more vacuum insulation panels within a refrigerator have failed or are otherwise allowing a detrimental amount of heat transfer, then various actions can be taken as a result. As examples, alternative sealed system algorithms can be used to prevent external condensation or food spoilage; air supply duct temperatures can be adjusted, or vacuum insulation pumps could be deployed (e.g. in an attempt to regain a vacuum seal). As another example, in the instance in which the refrigerator is connected to a network, then an indication of the extent and nature of the panel failure could be provided to the user and/or the manufacturer so as to prompt a repair.

In such fashion, the proper functioning of vacuum insulation panels can be rapidly and accurately tested and/or monitored throughout the lifetime of a refrigerator. In particular, the RFID system of the present disclosure can employ RFID temperature sensors that utilize a conductive barrier layer of each vacuum insulation panel as a low-cost antenna.

Example Systems

FIG. 1 depicts a first example sensor placement according to an example embodiment of the present disclosure. In particular, a vacuum insulation panel 102 can be included within a refrigerator wall 104. Refrigerator wall 104 can include an exterior panel 106 and an interior panel 108. The exterior panel 106 can be made of steel (e.g. stainless steel), other metals, or plastic. The interior panel 108 can be made of plastic (e.g. acrylonitrile butadiene styrene or high-impact polystyrene) or other suitable materials. The refrigerator wall 104 can separate a refrigerated compartment from the exterior environment.

Vacuum insulation panel 102 may be constructed in any suitable manner. For example, vacuum insulation panel 102 may include an outer conductive barrier layer that defines an interior vacuum chamber of vacuum insulation panel 102. The conductive barrier layer may be constructed of or with any suitable material, including, for example, aluminum, stainless steel, or other conductive materials. The conductive barrier layer can form a jacket around the vacuum insulation panel 102.

The interior vacuum chamber of vacuum insulation panel 102 can be filled with an insulating media, such as fiberglass, foamed insulation, open cell foamed insulation, etc. The interior vacuum chamber of vacuum insulation panel 102 may be at least partially evacuated of atmospheric gases to form vacuum insulation panel 102. The insulating media within the interior vacuum chamber of vacuum insulation panel 102 may oppose atmospheric pressure that urges vacuum insulation panel 102 to collapse.

In some embodiments, a getter system can also located in vacuum insulation panel 102. Once activated, the getter will absorb most residual gases (i.e., $H_2$, $O_2$, $N_2$) and water vapor to maintain the vacuum in the panel throughout its extended life.

An RFID temperature sensor 110 can be positioned adjacent to an interior face of the vacuum insulation panel 102 (e.g. on the refrigerated side of the vacuum insulation panel 102.) The temperature sensor 110 can be located outside of the panel 102, as shown in FIG. 1. Alternatively, in some embodiments, the RFID temperature sensor 110 can be internal to the panel 102. The RFID temperature sensor can use the conductive barrier layer of vacuum insulation panel 102 as an antenna when transmitting information.

An insulating foam 112 such as a polyurethane foam, may be positioned or disposed within the interior volume of the refrigerator wall 104. The insulating foam 112 and the liner may be positioned opposite each other on vacuum insulation panel 102.

In one example manufacturing process, an expandable foam material, such as a polyurethane foam, can be injected into the refrigerator wall 104, to provide a desired degree of thermal insulation to the refrigerator. Foam injecting methods can include mixing a predetermined amount of starting chemicals and injecting them at a predetermined location within the refrigerator wall 104, from which location the foaming process essentially begins. The foaming mixture can then expand within the wall 104 flowing throughout available space between the exterior panel 106 and the interior panel 108. In some embodiments, the foam expansion can be an exothermic reaction that generates heat.

Figure 2:
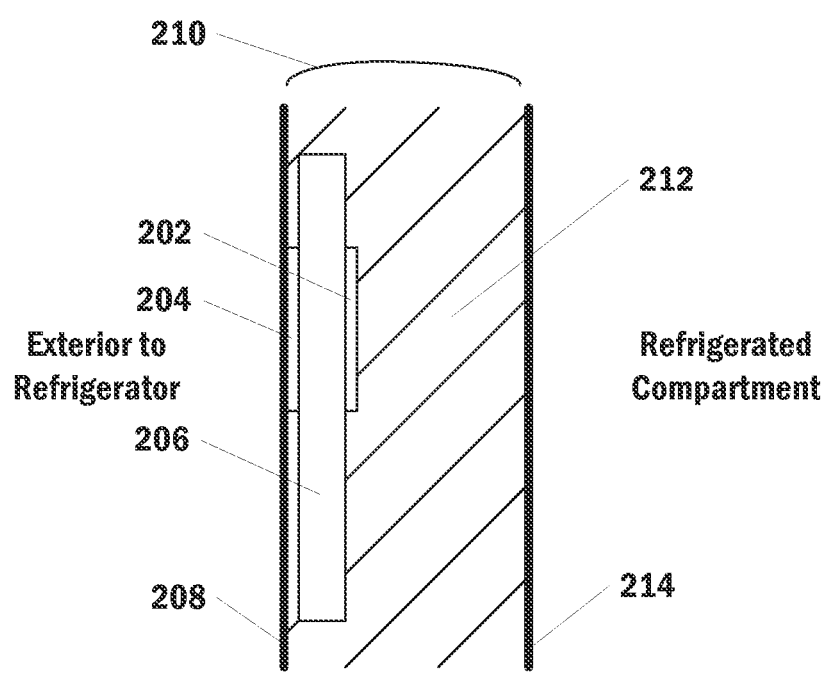
FIG. 2 depicts a second example sensor placement according to an example embodiment of the present disclosure.

FIG. 2 depicts a second example sensor placement according to an example embodiment of the present disclosure. In particular, in the second example sensor placement, a pair of RFID temperature sensors 202 and 204 can be respectively positioned on the interior and exterior faces of a vacuum insulation panel 206. The vacuum insulation panel 206 can be positioned adjacent to an exterior panel 208 of the refrigerator wall 210. An insulating foam 212 can fill a volume between the vacuum insulation panel 206 and an interior panel 214 of the refrigerator wall 210.

Figure 3:
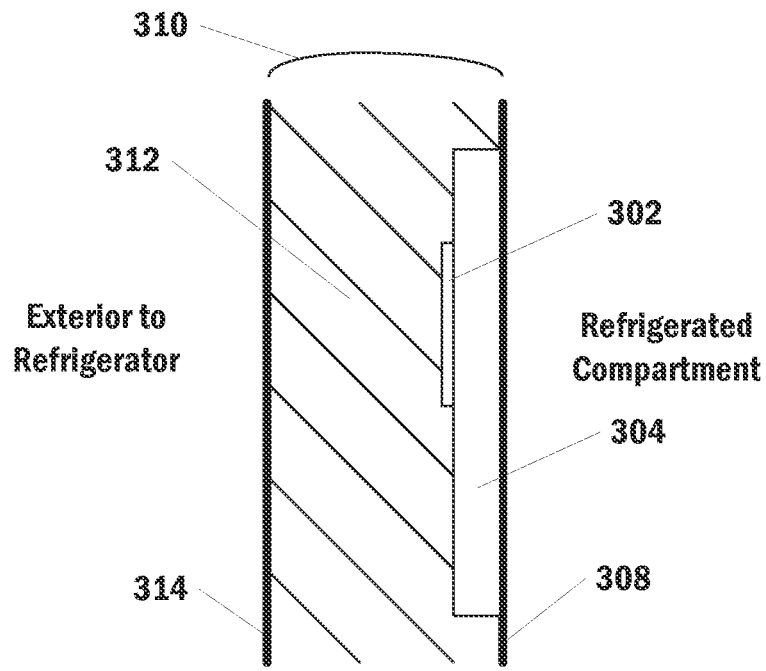
FIG. 3 depicts a third example sensor placement according to an example embodiment of the present disclosure.

FIG. 3 depicts a third example sensor placement according to an example embodiment of the present disclosure. In particular, in the third example sensor placement, an RFID temperature sensor 302 can be positioned adjacent to an exterior face of a vacuum insulation panel 304. The vacuum insulation panel 304 can be positioned adjacent to an interior panel 308 of the refrigerator wall 310. An insulating foam 312 can fill a volume between the vacuum insulation panel 304 and an exterior panel 314 of the refrigerator wall 310.

Figure 4:
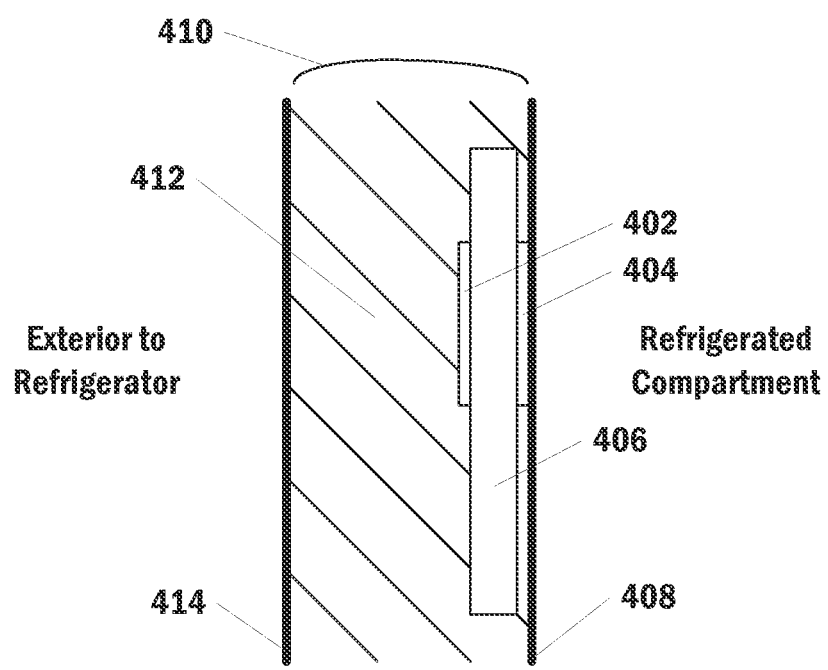
FIG. 4 depicts a fourth example sensor placement according to an example embodiment of the present disclosure.

FIG. 4 depicts a fourth example sensor placement according to an example embodiment of the present disclosure. In particular, in the fourth example sensor placement, a pair of RFID temperature sensors 402 and 404 can be respectively positioned on the exterior and interior faces of a vacuum insulation panel 406. The vacuum insulation panel 406 can be positioned adjacent to an interior panel 408 of the refrigerator wall 410. An insulating foam 412 can fill a volume between the vacuum insulation panel 406 and an exterior panel 414 of the refrigerator wall 410.

Figure 5:
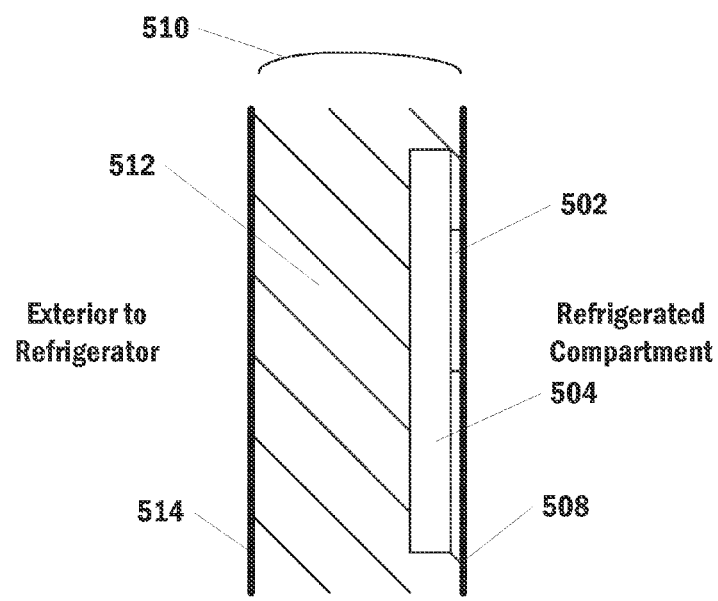
FIG. 5 depicts a fifth example sensor placement according to an example embodiment of the present disclosure.

FIG. 5 depicts a fifth example sensor placement according to an example embodiment of the present disclosure. In particular, in the fifth example sensor placement, an RFID temperature sensor 502 can be positioned adjacent to an interior face of a vacuum insulation panel 504. The vacuum insulation panel 504 can be positioned adjacent to an interior panel 508 of the refrigerator wall 510. An insulating foam 512 can fill a volume between the vacuum insulation panel 504 and an exterior panel 514 of the refrigerator wall 510.

It should be appreciated that the example sensor placements shown in FIGS. 1-5 are provided as examples only. Many different placements can be used in many different combinations in satisfaction of the present disclosure.

Figure 6:
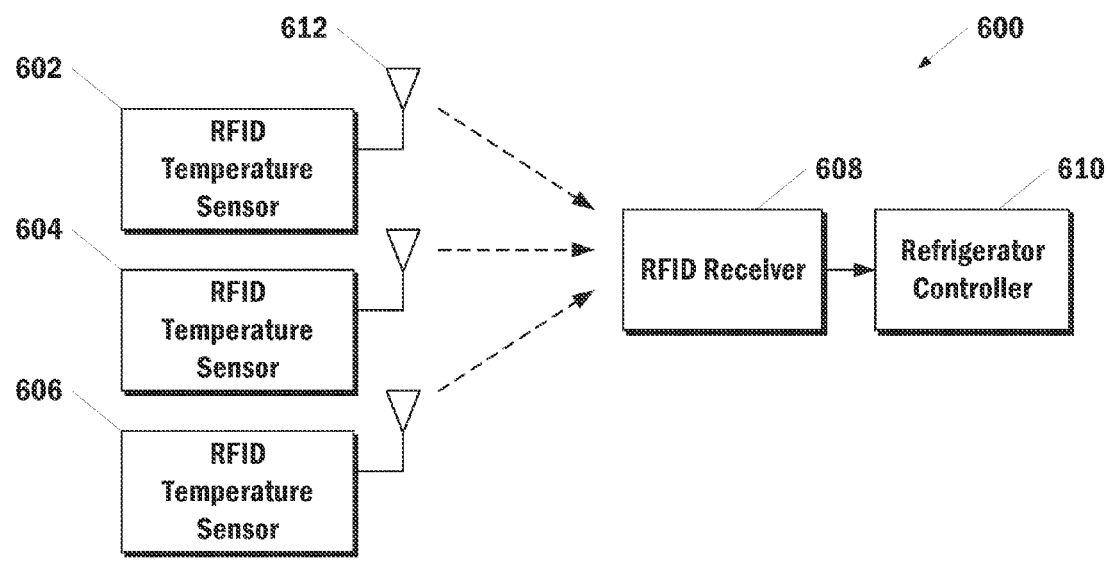
FIG. 6 depicts a block diagram of an example system according to an example embodiment of the present disclosure.

FIG. 6 depicts a block diagram of an example system 600 according to an example embodiment of the present disclosure. System 600 can include a plurality of RFID temperature sensors (e.g. sensors 602, 604, and 606). Each of the plurality of temperature sensors can collect data indicative of a local temperature at such sensor. For example, each temperature sensor can include a thermistor and can measure the temperature by placing a current through or voltage across the thermistor.

Each RFID temperature sensor can be actively powered by a battery or other power source. Alternatively, each RFID temperature sensor can be passively powered by capturing external electrical impulse energy. For example, the externally gathered energy can accumulate or can be immediately utilized to energize the temperature measurement device and transmit the temperature information to the receiver. Use of passively powered RFID sensors can provide a reduced risk when the sensors are used in conjunction with an unstable or volatile foaming agent.

The plurality of sensors can wirelessly communicate the temperature data to an RFID receiver 608. For example, each RFID temperature sensor can transmit temperature information to RFID receiver 608 periodically or can transmit such information upon the RFID sensor being queried or otherwise electronically requested to transmit the temperature measurement. The transmitted information can include an actual temperature reading or can be a sensor value that can be used to calculate or otherwise determine the local temperature at the sensor.

The receiver 608 can provide the temperature data to a refrigerator controller 610. As used herein, a controller can include any processor, microprocessor, microcontroller, integrated circuit, ASIC, or other computing means. In some embodiments, the refrigerator controller 610 can be one or more general purpose processors executing instructions stored in a local memory. For example, the memory can be RAM, ROM, EEPROM, or other forms of computer memory. The refrigerator controller 610 can control various operations and parameters of a refrigerator in which system 600 is located.

Furthermore, according to an aspect of the present disclosure, when each RFID temperature sensor transmits information, it can utilize a conductive barrier layer of an adjacent corresponding vacuum insulation panel as an antenna. In particular, each vacuum insulation panel can include a conductive barrier layer that forms a jacket around the panel. For example, the barrier layer can be a layer of aluminum, steel, or other metal.

The RFID temperature sensor can use such conductive barrier layer as a transmitter antenna. As an example, RFID temperature sensor 602 can use the conductive barrier layer of an adjacently located vacuum insulation panel as an antenna 612 when transmitting information. Use of the barrier layer as an antenna can improve transmission strength and reduce the cost of manufacturing the RFID sensors as additional antennas will not be needed.

The RFID reader 608 can read or otherwise communicate with multiple RFID sensors simultaneously. Therefore, a single RFID reader 608 can be easily deployed to monitor or test multiple vacuum insulation panels at a single time, thereby reducing cycle time for quality checks.

Example Methods

Figure 7:
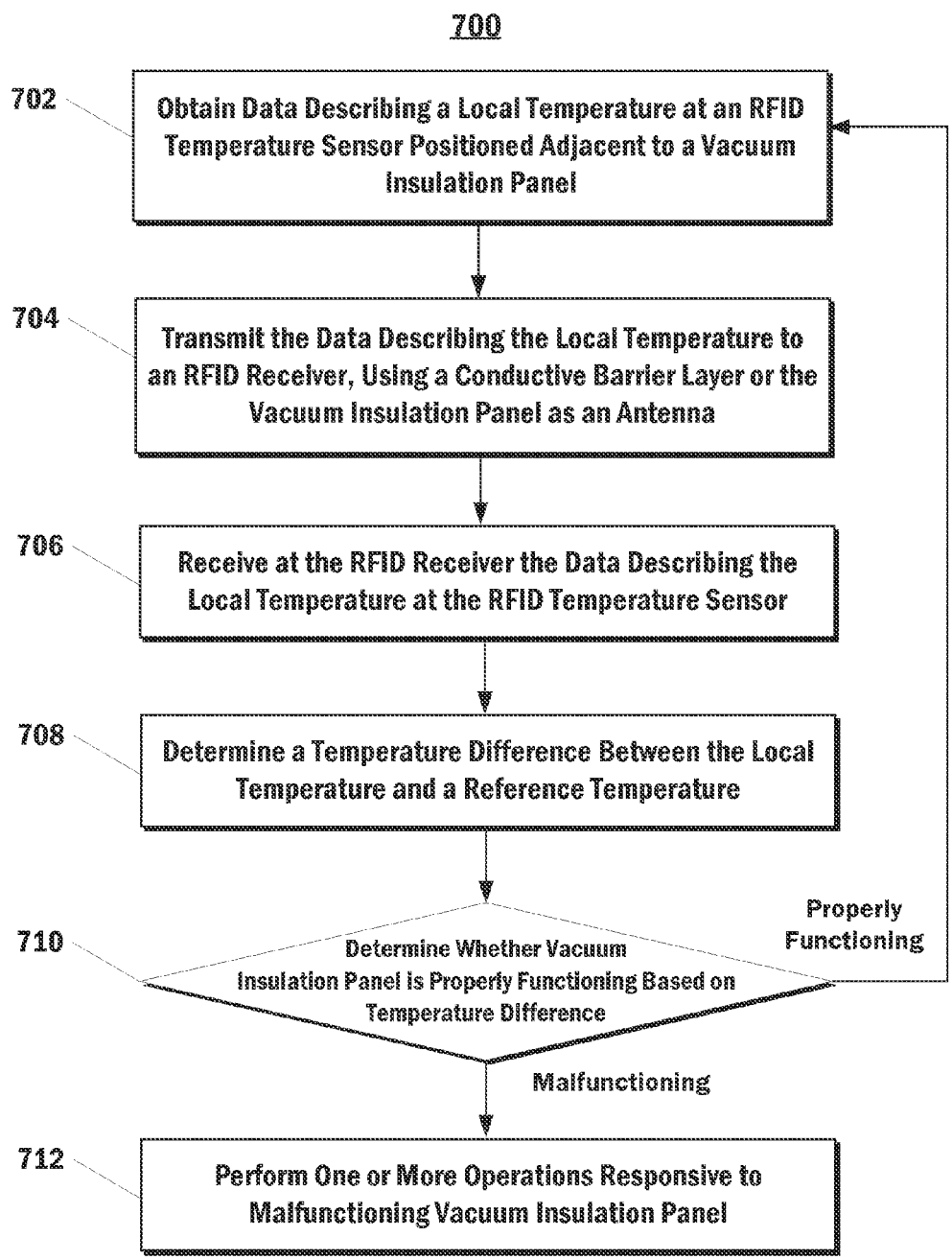
FIG. 7 depicts a flow chart of an example method for monitoring functionality of vacuum insulation panels according to an example embodiment of the present disclosure.

FIG. 7 depicts a flow chart of an example method (700) for monitoring functionality of vacuum insulation panels according to an example embodiment of the present disclosure. Example method (700) can be implemented using any suitable system. In addition, although FIG. 7 depicts steps performed in a particular order for purposes of illustration and discussion, methods of the present disclosure are not limited to such particular order or arrangement. One skilled in the art, using the disclosures provided herein, will appreciate that various steps of the method (700) can be omitted, rearranged, combined, and/or adapted in various ways without deviating from the scope of the present disclosure.

At (702) data can be obtained that describes a local temperature at an RFID temperature sensor. The temperature sensor can be positioned adjacent to a vacuum insulation panel.

As an example, the RFID temperature sensor can include a thermistor. A predetermined current or voltage can be used to obtain temperature data from the thermistor.

At (704) the data describing the local temperature can be transmitted to an RFID receiver. In particular, a conductive barrier layer of the adjacent vacuum insulation panel can be used as an antenna for the transmission.

At (706) the data describing the local temperature at the RFID temperature sensor can be received at the RFID receiver. The RFID receiver can provide the received information to a controller or other processing apparatus.

At (708) a temperature difference between the local temperature and a reference temperature can be determined. As an example, the reference temperature can be a predetermined temperature stored and accessed from memory. For example, the predetermined temperature can be a temperature associated with an average room temperature or an average refrigeration chamber temperature.

As another example, the reference temperature can be a current temperature of a refrigeration chamber. Thus, the local temperature at the RFID temperature sensor can be compared to an internal refrigerator temperature. The current temperature of the refrigeration chamber can be obtained by an additional temperature sensor positioned within the refrigeration chamber. Alternatively, a current set point temperature or target temperature can be used as the current temperature of the refrigeration chamber.

As another example, the reference temperature can be a second local temperature measured at a second RFID temperature sensor that is located on an opposite side of the vacuum insulation panel from the aforementioned RFID temperature sensor. Thus, the temperature difference determined at (708) can compare local temperatures at opposite sides of a vacuum insulation panel.

As yet another example, the reference temperature can be a historical local temperature previously observed by the same RFID temperature sensor. Thus, in such embodiments, a larger temperature difference may be indicative of changed temperature situations.

At (710) it can be determined whether the vacuum insulation panel is properly functioning based on the temperature difference. As an example, in embodiments in which the RFID temperature sensor is positioned adjacent to an interior face of the vacuum insulation panel and the reference temperature is a current refrigerated chamber temperature, then at (710) the temperature difference can be compared to a threshold value. In particular, if the temperature difference is greater than the threshold value, then it can be determined that the vacuum insulation panel is not properly functioning. In other words, if the temperature on the internal side of the vacuum insulation panel is substantially different than the current refrigerated chamber temperature, then the panel is likely allowing large amounts of heat flux from the exterior of the refrigerator and is, therefore, not properly operating.

As another example, in embodiments in which the RFID temperature sensor is a first temperature sensor that is positioned on a first side of the vacuum insulation panel and the reference temperature is a local temperature at a second RFID temperature sensor positioned on a second, opposite side of the vacuum insulation panel, then at (710) the temperature difference can be compared to a threshold value. In particular, if the temperature difference is less than the threshold value, then it can be determined that the vacuum insulation panel is not properly functioning. In other words, if the temperature on the internal side of the vacuum insulation panel is within a threshold difference from the temperature on the external side of the vacuum insulation panel, then the panel is likely allowing large amounts of heat flux from the exterior of the refrigerator and is, therefore, not properly operating.

If it is determined at (710) that the vacuum insulation panel is properly functioning, then method (700) can return to (702) and obtain additional data describing an updated local temperature.

However, if it is determined at (710) that the vacuum insulation panel is not properly functioning, then method (700) can proceed to (712).

At (712) one or more operations can be performed in response to the malfunctioning vacuum insulation panel. As example, the one or more operations can include adjusting one or more of a control algorithm for a sealed refrigerant system and one or more air supply duct temperatures; deploying a vacuum insulation pump; and/or communicating within an external computing device (e.g. a user's mobile phone or a manufacturer's server) over a wide area network.

Figure 8:
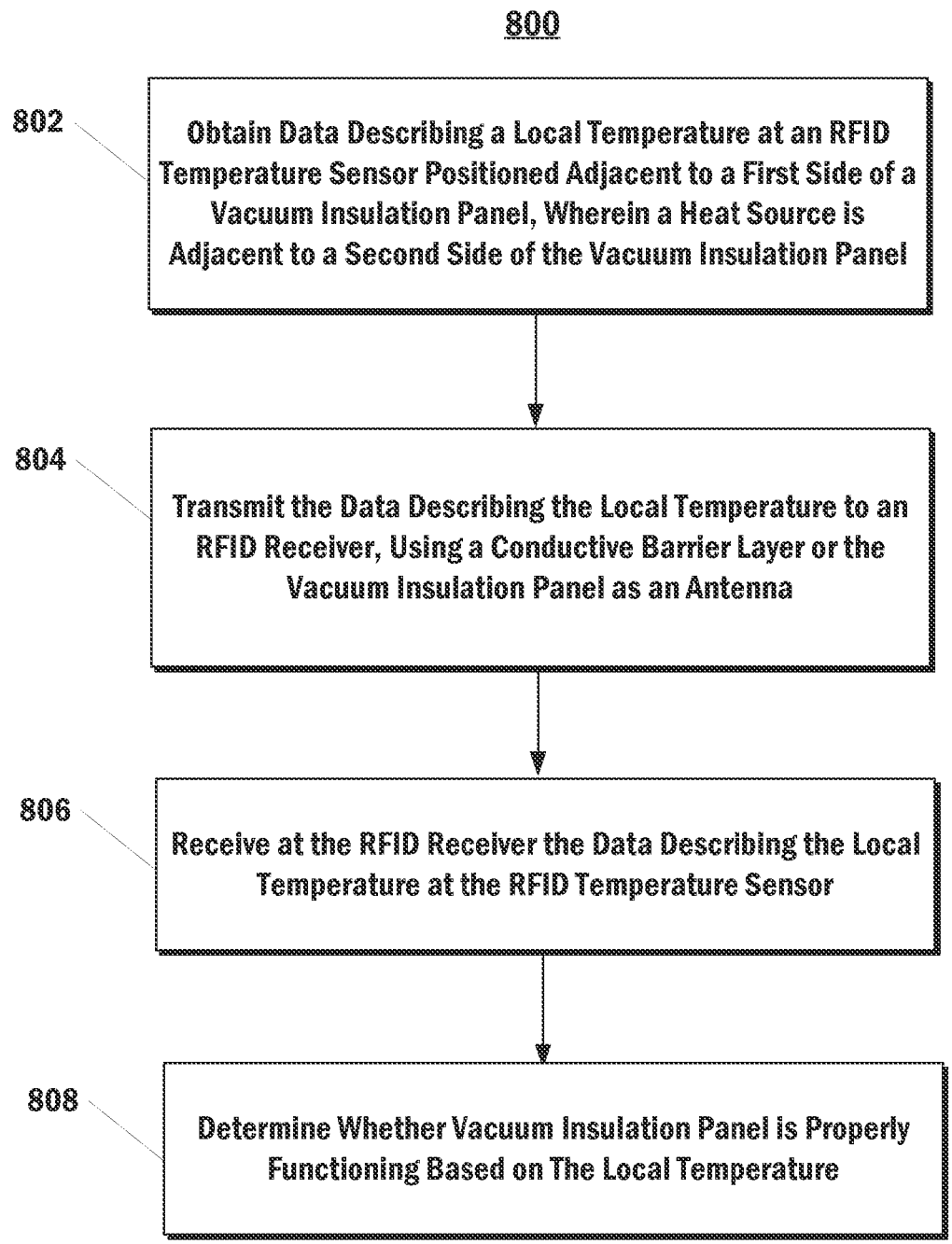
FIG. 8 depicts a flow chart of an example method for testing functionality of vacuum insulation panels according to an example embodiment of the present disclosure.

FIG. 8 depicts a flow chart of an example method (800) for testing functionality of vacuum insulation panels according to an example embodiment of the present disclosure. Example method (800) can be implemented using any suitable system. In addition, although FIG. 8 depicts steps performed in a particular order for purposes of illustration and discussion, methods of the present disclosure are not limited to such particular order or arrangement. One skilled in the art, using the disclosures provided herein, will appreciate that various steps of the method (800) can be omitted, rearranged, combined, and/or adapted in various ways without deviating from the scope of the present disclosure.

At (802) data can be obtained that describes a local temperature at an RFID temperature sensor. As an example, the RFID temperature sensor can include a thermistor. A predetermined current or voltage can be used to obtain temperature data from the thermistor.

The temperature sensor can be positioned adjacent to a vacuum insulation panel. In addition, a heat source can be adjacent to a second side of the vacuum insulation panel. For example, the heat source can be a heated table. As another example, the heat source can be an exothermic reaction associated with installation of foam insulation. In other embodiments, the heat source can be heat from the environment exterior to a refrigerator.

At (804) the data describing the local temperature can be transmitted to an RFID receiver. In particular, a conductive barrier layer of the adjacent vacuum insulation panel can be used as an antenna for the transmission.

At (806) the data describing the local temperature at the RFID temperature sensor can be received at the RFID receiver. The RFID receiver can provide the received information to a controller or other processing apparatus.

At (808) it can be determined whether the vacuum insulation panel is properly functioning based on the local temperature. As an example, at (808) it can be determined that the vacuum insulation panel is not properly functioning when the local temperature at the RFID temperature sensor exceeds a threshold value. In other words, if the local temperature at the RFID temperature sensor is greater than the threshold value, then the vacuum insulation panel is allowing an undesirable amount of heat flux from the heat source. Therefore, the vacuum insulation panel can be identified as not properly functioning.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator comprising:
a plurality of vacuum insulation panels respectively positioned within a plurality of walls of the refrigerator, the plurality of walls of the refrigerator defining an interior refrigerated space, wherein each of the plurality of vacuum insulation panels comprises a conductive barrier layer forming a jacket around such vacuum insulation panel;
a radio frequency identification (RFID) receiver;
a plurality of RFID temperature sensors respectively positioned adjacent to the plurality of vacuum insulation panels, wherein each of the plurality of RFID temperature sensors transmits temperature information concerning a local temperature to the RFID receiver, and wherein each of the plurality of RFID temperature sensors utilizes the conductive barrier layer of its adjacent vacuum insulation panel as an antenna during the transmission of the temperature information; and
a controller that:
obtains the information concerning the local temperature at each RFID temperature sensor from the RFID receiver;
analyzes the respective temperature information received from each of the plurality of RFID temperature sensors; and
identifies a first vacuum insulation panel of the plurality of vacuum insulation panels that is not properly functioning based at least in part on the respective temperature information received from a first RFID temperature sensor of the plurality of temperature sensors that is positioned adjacent to the first vacuum insulation panel.

2. The refrigerator of claim 1, wherein each of the plurality of RFID temperature sensors does not include an additional antenna in addition to the use of the conductive barrier layer of its adjacent vacuum insulation panel as the antenna.

3. The refrigerator of claim 1, wherein, in response to identification of the first vacuum insulation panel that is not properly functioning, the controller adjusts one or more of a control algorithm for a sealed refrigerant system and one or more air supply duct temperatures.

4. The refrigerator of claim 1, wherein, in response to identification of the first vacuum insulation panel that is not properly functioning, the controller deploys one or more vacuum insulation pumps associated with the first vacuum insulation panel.

5. The refrigerator of claim 1, wherein, in response to identification of the first vacuum insulation panel that is not properly functioning, the controller communicates with an external computing device over a wide area network, the communication with the external computing device indicating the malfunctioning of the first vacuum insulation panel.

6. The refrigerator of claim 1, wherein each of the plurality of RFID temperature sensors is positioned adjacent to an interior face of its corresponding vacuum insulation panel.

7. The refrigerator of claim 6, wherein the controller identifies the first vacuum insulation panel that is not properly functioning based on a temperature difference between the local temperature at the first RFID temperature sensor and an interior refrigerator compartment temperature.

8. The refrigerator of claim 1, wherein each of the plurality of vacuum insulation panels has one of the plurality of RFID temperature sensors positioned adjacent to an interior face of such vacuum insulation panel and has one of the plurality of RFID temperature sensors positioned adjacent to an exterior face of such vacuum insulation panel.

9. The refrigerator of claim 8, wherein the controller identifies the first vacuum insulation panel that is not properly functioning based on a temperature difference between the local temperature at the first RFID temperature sensor positioned adjacent to the interior face of the first vacuum insulation panel versus a second RFID temperature sensor positioned adjacent to the exterior face of the first vacuum insulation panel.

10. A method for monitoring functionality of vacuum insulation panels installed within a refrigerator, the method comprising:
   transmitting, by each of a plurality of radio frequency identification (RFID) temperature sensors, data describing a local temperature at such RFID temperature sensor, wherein the plurality of RFID temperature sensors are respectively positioned adjacent to a plurality of vacuum insulation panels installed within a refrigerator, and wherein each of the plurality of RFID temperature sensors uses a conductive barrier layer of the respective vacuum insulation panel as an antenna to perform the transmitting;
   receiving, by an RFID receiver included within the refrigerator, the data describing the respective local temperature at each of the plurality of RFID temperature sensors;
   providing, by the RFID receiver, the data received from each of the plurality of RFID temperature sensors to a controller included within the refrigerator;
   determining, by the controller, a respective temperature difference between the local temperature at each RFID temperature sensor and a reference temperature; and
   identifying, by the controller, a first vacuum insulation panel of the plurality of vacuum insulation panels that is not properly functioning based at least in part on the respective temperature difference determined for a first RFID temperature sensor of the plurality of RFID temperature sensors, the first RFID temperature sensor positioned adjacent to the first vacuum insulation panel.

11. The method of claim 10, wherein the reference temperature for each RFID temperature sensor comprises a historical local temperature previously observed by such RFID temperature sensor.

12. The method of claim 10, wherein:
   each of the plurality of RFID temperature sensors is positioned adjacent to an interior face of its respective vacuum insulation panel; and
   the reference temperature comprises an internal refrigeration chamber temperature.

13. The method of claim 12, wherein detecting, by the controller, that the first vacuum insulation panel is not properly functioning comprises determining, by the controller, that the first vacuum insulation panel is not properly functioning when the temperature difference between the local temperature at the first RFID temperature sensor and the internal refrigeration chamber temperature exceeds a threshold value.

14. The method of claim 10, wherein:
   the first RFID temperature sensor is positioned adjacent to an interior face of the first vacuum insulation panel and transmits data describing a first local temperature; and
   the reference temperature comprises a second local temperature at a second RFID tempera re sensor positioned adjacent to an exterior face of the first vacuum insulation panel.

15. The method of claim 14, wherein identifying, by the controller, the first vacuum insulation panel that is not properly functioning comprises determining, by the controller, that the first vacuum insulation panel is not properly functioning when the temperature difference between the first local temperature at the first RFID temperature sensor and the second local temperature at the second RFID temperature sensor falls below a threshold value.

* * * * *

UNITED STATES PATENT AND TRADEMARK OFFICE
CERTIFICATE OF CORRECTION

PATENT NO. : 9,476,635 B2
APPLICATION NO. : 14/314472
DATED : October 25, 2016
INVENTOR(S) : Roger Shawn Nelson Page 1 of 1

It is certified that error appears in the above-identified patent and that said Letters Patent is hereby corrected as shown below:

In the Claims

In Column 12, Line 38 (Claim 14), please change "tempera re" following "RFID" to "temperature,"

Signed and Sealed this
Third Day of April, 2018

Andrei Iancu
*Director of the United States Patent and Trademark Office*